United States Patent
Kaiky et al.

(10) Patent No.: US 12,204,882 B2
(45) Date of Patent: Jan. 21, 2025

(54) METHODOLOGY FOR CONSTRUCTING STATICALLY RECONFIGURABLE SOFT-PROCESSOR CORES FOR HARDWARE ACCELERATION OF ALGORITHMS

(71) Applicant: SK hynix Inc., Gyeonggi-do (KR)

(72) Inventors: Mikhail Kaiky, Minsk (BY);
Alexander Ivaniuk, Minsk (BY);
Siarhei Zalivaka, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/089,413

(22) Filed: Dec. 27, 2022

(65) Prior Publication Data
US 2024/0211223 A1  Jun. 27, 2024

(51) Int. Cl.
*G06F 8/41* (2018.01)

(52) U.S. Cl.
CPC .............. *G06F 8/4435* (2013.01); *G06F 8/43* (2013.01)

(58) Field of Classification Search
None
See application file for complete search history.

(56) References Cited

U.S. PATENT DOCUMENTS

| | | | |
|---|---|---|---|
| 7,278,137 B1 * | 10/2007 | Fuhler | G06F 8/4434 717/151 |
| 8,327,126 B2 * | 12/2012 | Bell, Jr. | G06F 15/7871 712/15 |
| 8,612,950 B2 * | 12/2013 | Shpeisman | G06F 8/443 717/151 |
| 10,719,464 B1 | 7/2020 | Jain et al. | |
| 10,768,913 B2 * | 9/2020 | Howlett | G06F 8/75 |
| 11,126,433 B2 | 9/2021 | Burger et al. | |
| 2013/0152057 A1 * | 6/2013 | Ke | G06F 8/453 717/132 |
| 2022/0137986 A1 | 5/2022 | Teh et al. | |

OTHER PUBLICATIONS

Lance A. Glasser et al., The Design and Analysis of VLSI Circuits, 1985, Addison-Wesley Publishing Company.
Bryon Moyer et al., Chapter 13 Hardware Accelerators, Real World Multicore Embedded Systems, 2013, Elsevier Inc.
Vivado Design Suite User Guide: Release Notes, Installation, and Licensing (UG973) (v2020.2), Feb. 3, 2021, Xilinx.

(Continued)

*Primary Examiner* — Marina Lee
(74) *Attorney, Agent, or Firm* — IP & T GROUP LLP

(57) ABSTRACT

A system and method for building a hardware accelerator. The system has at least one processor including at least one core configured to perform based on machine code an operation for a specific algorithm of the hardware accelerator. The system has a code analyzer for reconfiguring the at least one processor to execute with the machine code the specific algorithm. The code analyzer is configured to repeatedly execute at least one of a) a static analysis on a software program for performance of the specific algorithm and b) a dynamic analysis regarding the machine code on different input sets of data. The code analyzer is configured to analyze results of the static analysis or the dynamic analysis to determine a configuration of the machine code for execution of the specific algorithm on the hardware accelerator.

20 Claims, 5 Drawing Sheets

(56) References Cited

OTHER PUBLICATIONS

Nexys 4™ FPGA Board Reference Manual, Apr. 11, 2016, Digilent.
7 Series Product Selection Guide, 2014, Xilinx.
Andrew Waterman et al., The RISC-V Instruction Set Manual, vol. I: Unprivileged ISA, Document Version 20191213, Dec. 13, 2019.
RISC-V Options Using the GNU Compiler Collection (GCC) Available: https://gcc.gnu.org/onlinedocs/gcc/RISC-V-Options.html#RISC-V-Options.
Ashok K. Agrawala et al., Foundations of Microprogramming, Architecture, Software, and Applications 1st Edition, Jan. 1, 1976, Academic Press, Inc. Available: https://archive.org/details/foundations-of-microprogramming-architecture-software-and-applications-by-ashok-/mode/2up?view=theater&ui=embed&wrapper=false.
Avdeev N. et al., Design and verification of SSD controllers, Information Technologies and Systems 2021 (ITS 2021), Nov. 24, 2021, pp. 8-16, Minsk, Belarus.

* cited by examiner

METHODOLOGY FOR CONSTRUCTING STATICALLY RECONFIGURABLE SOFT-PROCESSOR CORES FOR HARDWARE ACCELERATION OF ALGORITHMS

BACKGROUND

1. Field

Embodiments of the present disclosure relate to methods and systems for building hardware accelerators.

2. Description of the Related Art

In general, as described in U.S. Pat. No. 10,719,464 (the entire contents of which are incorporated herein by reference), hardware acceleration involves the use of hardware to perform some functions more efficiently than software executing on a general-purpose CPU. A hardware accelerator is special-purpose hardware designed to implement hardware acceleration for some application. Example applications include neural networks, video encoding, decoding, transcoding, etc., network data processing, and the like. Software executing on the computing system interacts with the hardware accelerator through various drivers and libraries. One type of hardware accelerator includes a programmable device and associated circuitry. For example, the programmable device can be a field programmable gate array (FPGA) or a system-on-chip (SOC) that includes FPGA programmable logic among other subsystems, such as a processing system, data processing engine (DPE) array, network-on-chip (NOC), and the like.

As described in US 2022/0137986 (the entire contents of which are incorporated herein by reference), application and tasks implemented on an integrated circuit can be accelerated by using different processing mechanisms such as a large scale multi-CPU parallel processing system having multiple processing cores. Applications can then be processed by more than one core processor in parallel so as to improve processing speed. The '986 published application described a method for dynamically configuring multiple processors by receiving, from an application, an acceleration request message including a task to be accelerated, determining a type of the task and searching a database of available accelerators to dynamically select a first accelerator based on the type of the task. The '986 published application also described a device having a) a first dynamic region of programmable logic circuitry configurable with one or more accelerators, b) a second dynamic region of the programmable logic circuitry also configurable with one or more accelerators, and c) a static region having programmable logic circuitry to support the first dynamic region and the second dynamic region.

In embedded systems, Systems on Chip (SoC) and Networks on Chip (NoC) developers need to ensure general reliability and ratio of performance to chip area and also power consumption. In such systems, hardware accelerators can be used as a solution for a specific task (class of tasks) which allows executing specialized algorithms with greater efficiency than a HOST-processor, thus freeing up processor time to perform device management tasks. For example, in addition to the HOST-processor, SSD controllers include processor subsystems, external memory management subsystems (SDRAM, DDR), memory management unit (MMU), I/O subsystems, bus controllers, NAND controller subsystem and accelerators for database systems.

SUMMARY

In one embodiment of the invention, there is provided a system for building a hardware accelerator. The system has at least one processor including at least one core configured to perform based on machine code an operation for a specific algorithm of the hardware accelerator. The system has a code analyzer for reconfiguring the at least one processor to execute with the machine code the specific algorithm. The code analyzer is configured to repeatedly execute at least one of a) a static analysis on a software program for performance of the specific algorithm and b) a dynamic analysis regarding the machine code on different input sets of data. The code analyzer is configured to analyze results of the static analysis or the dynamic analysis to determine a configuration of the machine code for execution of the specific algorithm on the hardware accelerator.

In another embodiment, there is provided a method for building a hardware accelerator. The method comprises developing and compiling a software program for a reconfigurable processor to perform a specific algorithm on the hardware accelerator; repeatedly analyzing using a code analyzer at least one of a) the software program to determine used resources needed to execute the specific algorithm and b) the used resources under different input sets of data to the specific algorithm; with the code analyzer, eliminating unused resources from the reconfigurable processor and determining a configuration of the machine code with the unused resources for execution of the specific algorithm on the hardware accelerator; and reconfiguring the reconfigurable processor to execute the specific algorithm.

Additional embodiments and aspects of the invention will become apparent from the following description.

DETAILED DESCRIPTION

Figure 1:
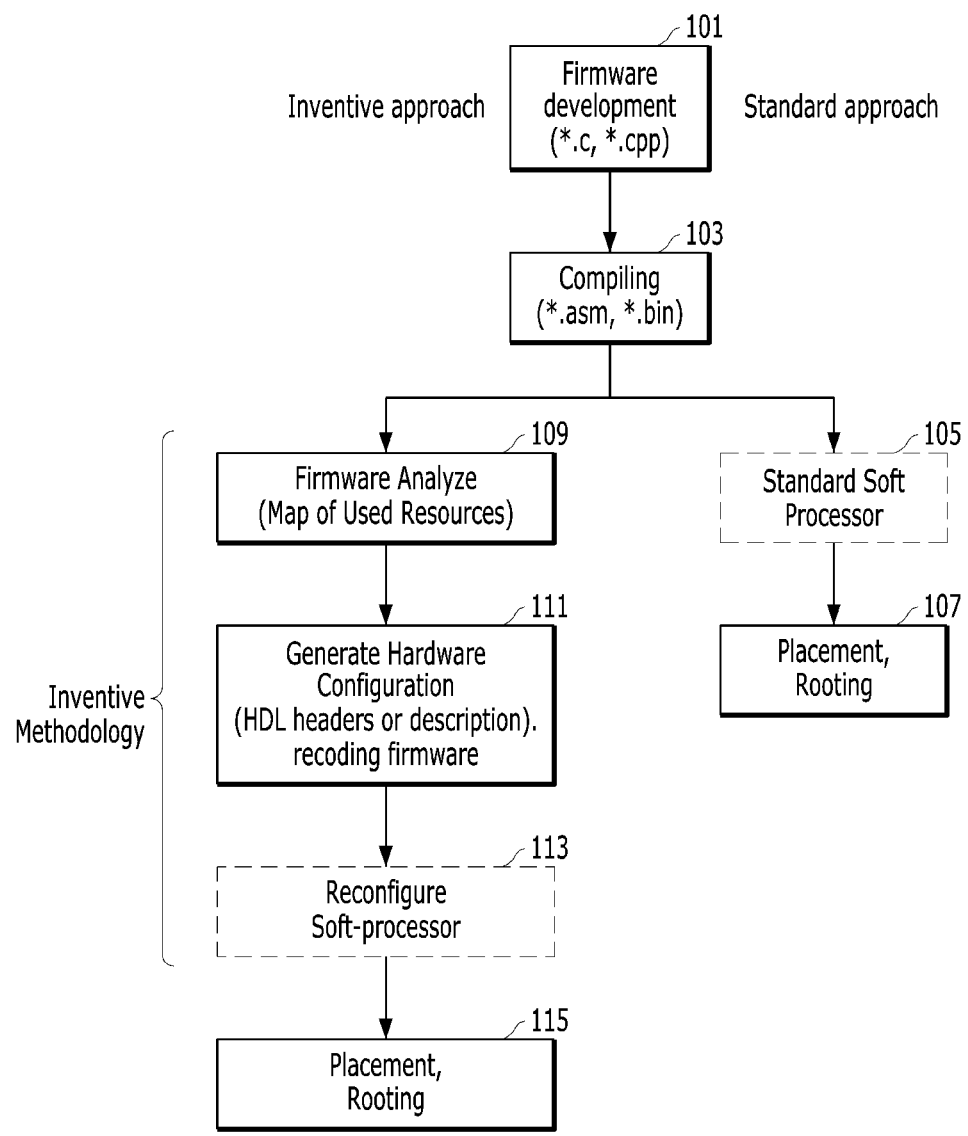
FIG. 1 is a schematic diagram illustrating the inventive approach of the present invention and a standard approach for building a hardware accelerator.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

In the following description, numerous specific details such as logic implementations, means to specify operands, resource partitioning/sharing/duplication implementations, types and components, and logic interrelationships of system partitioning/integration choices may be set forth in order to provide a more thorough understanding of the present invention. It will be appreciated, however, by one skilled in the art that the invention may be practiced without such specific details.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents within the scope of the disclosure. Numerous specific details are set forth in the following description in order to provide an understanding of the invention. These details are provided for the purpose of example; the invention may be practiced according to the disclosure without some or all of the specific details.

In one embodiment of the invention, there is provided a method for designing specialized soft-processor cores which can be used as hardware accelerators. Based on an algorithm specified at the design stage to be executed by the hardware accelerator, the inventive method for building a hardware accelerator provides for reduced hardware (and its cost) by reducing or eliminating architectural and/or microarchitectural hardware components at the design phase of building the hardware accelerators.

Indeed, the conventional building of hardware accelerators is a labor-intensive, resource-intensive process, unique for each hardware accelerator task. One of the most common methods for building hardware accelerators utilizes a) a co-processor containing standard-type cores, such as reconfigurable soft-processors for programming, and customized processor cores, b) code analyzer (s, and c) circuit (hardware) implementations of a specified algorithm to be used for the specific hardware accelerator being designed. Examples of hardware accelerators (which the inventive hardware accelerator builder can build) include hardware description(s) for at least field-programmable gate arrays (FPGA), application-specific integrated circuits (ASIC), Systems-on-Chip (SOC), and Networks on Chip (NoC).

The inventive technique for building hardware accelerators obtains a soft-processor core (i.e., a statically and/or dynamically reconfigured processor) with reduced hardware resources relative to the conventional implementation of a specific algorithm by a hardware accelerator. Obtaining a soft-processor core with reduced hardware resources by way of the inventive methodology a) provides an address space for data memory and machine instructions, b) excludes machine instructions and/or general and special purpose registers not used by the specified algorithm to be executed in the hardware accelerator, c) changes the coding of machine commands (changes in the operational and address parts of the command), and/or d) reduces the redundancy of the microprocessor microarchitecture due to changes in the operating and control parts of the microprocessor hardware core.

In one embodiment of the invention, because the inventive methodology is capable of a static reconfiguration of the microprocessor core, the inventive methodology may obtain the necessary core settings and make the changes to the operating and control parts of the microprocessor hardware core related to the specific algorithm to be run by the hardware accelerator (such as the bubble sort algorithm example described later). The changes to the operating and control parts of the microprocessor hardware core can be implemented by one or more of the code analyzers (described in more detail later).

FIG. 1 is a block diagram showing one embodiment of the invention contrasted with a standard, conventional approach. In both the inventive approach and in the standard approach, at 101, firmware is developed (that is a software program is produced) for performing a specified algorithm to be implemented in the hardware accelerator. In both the inventive approach and in the standard approach, at 103, the software program is compiled producing a software-based set of instructions for coding the hardware accelerator to perform the specific algorithm. In the standard approach, at 105, a known (standard) soft-processor would be utilized to execute the software-based instructions and provide inputs to the hardware accelerator in order for the hardware accelerator to perform a specific arithmetic or logic on the input data supplied to the hardware accelerator. The inputs to the hardware accelerator (for example, system bus bit width, size of cache, etc.) can be considered as a static configuration of the hardware accelerator. In the standard approach, at 107, the programmed hardware accelerator is placed and routed on the hardware platform which involves an algorithm for placing and interconnecting (routing) logic gates on a FPGA, CPLD or ASIC chip.

In the inventive hardware accelerator builder approach of the invention, at 109, the firmware produced at 103 is analyzed by generating from the firmware a map of used resources (i.e., a map of the hardware resources needed to perform the specific algorithm that the hardware accelerator will execute). At 111, a hardware configuration for a microprocessor system is generated (e.g., hardware description language HDL headers or descriptions are generated), and redundancies or unused resources found in the hardware are addressed by a reconfiguration of the soft-processor. At 113, the soft-processor is reconfigured to eliminate the redundancies or unused resources. At 115, the reconfigured hardware accelerator is implemented for target hardware platform, where Placement and Routing are the main parts of this process.

To carry out the process of reconfiguration of the microprocessor system in accordance with the algorithm specified at the design stage, this component of the inventive process can be divided into the following exemplary stages (implemented by one or more code analyzers):

1. Development of firmware with its testing, verification and debugging.
2. Obtaining files with machine codes of programs for a predetermined microprocessor architecture using a compilation or translation process.
3. Analyzing the machine code of the program in order to obtain the configuration of a pre-obtained (standard) microarchitecture of the microprocessor.
4. Generation of the configuration of the microprocessor core being used.
5. Synthesis of the resulting microprocessor core.

In the third stage above where the machine code is analyzed, analysis of machine code (or program code) may be carried out in a static analysis stage and in a dynamic analysis stage.

Static analysis is the analysis of machine code (or program code) carried out without executing the analyzed code on any computer or emulator. Carrying out such an analysis involves a sequential enumeration of all instructions in the machine code of the program, and then the decoding and construction of the following types of specialized maps:

a. Instructions coverage map,
   b. Address coverage map for registering file access, and
   C. Address coverage map for accessing memory of machine instructions Dynamic analysis involves the preliminary execution of the program code (or machine code) intended for the hardware accelerator in order to obtain the dynamic characteristics of the hardware accelerator. The dynamic characteristics of the executable machine code may include for example:

a. Range values of constants,
   b. Received data memory addresses,
   C. The sequence of machine commands (in order to determine the presence of hazards in data, in control), and
   d. List of data hazards in the program for a specific microarchitecture.

According to one embodiment of the invention, dynamic analysis on different input sets of data processed by the hardware accelerator occurs repeatedly. The purpose of such repetitions is to obtain a complete coverage of all possible branches of a graph of the computational process for the specific algorithm to be implemented. Otherwise, with an insufficient set of input data, the dynamic analysis may generate a core configuration of the hardware accelerator that might be unsuitable for correct execution. Thus, after N runs with dynamic analysis for several sets of input data, N reports on the dynamic characteristics of the executable code are obtained and compared. An "OR" operation in the code analyzers between equivalent characteristics is one way to compare the reports. The value of N depends directly on the content of the input data set, namely, the ability to cover (i.e., execute on the emulator) all branches of a graph computational process needed during execution.

Figure 2:
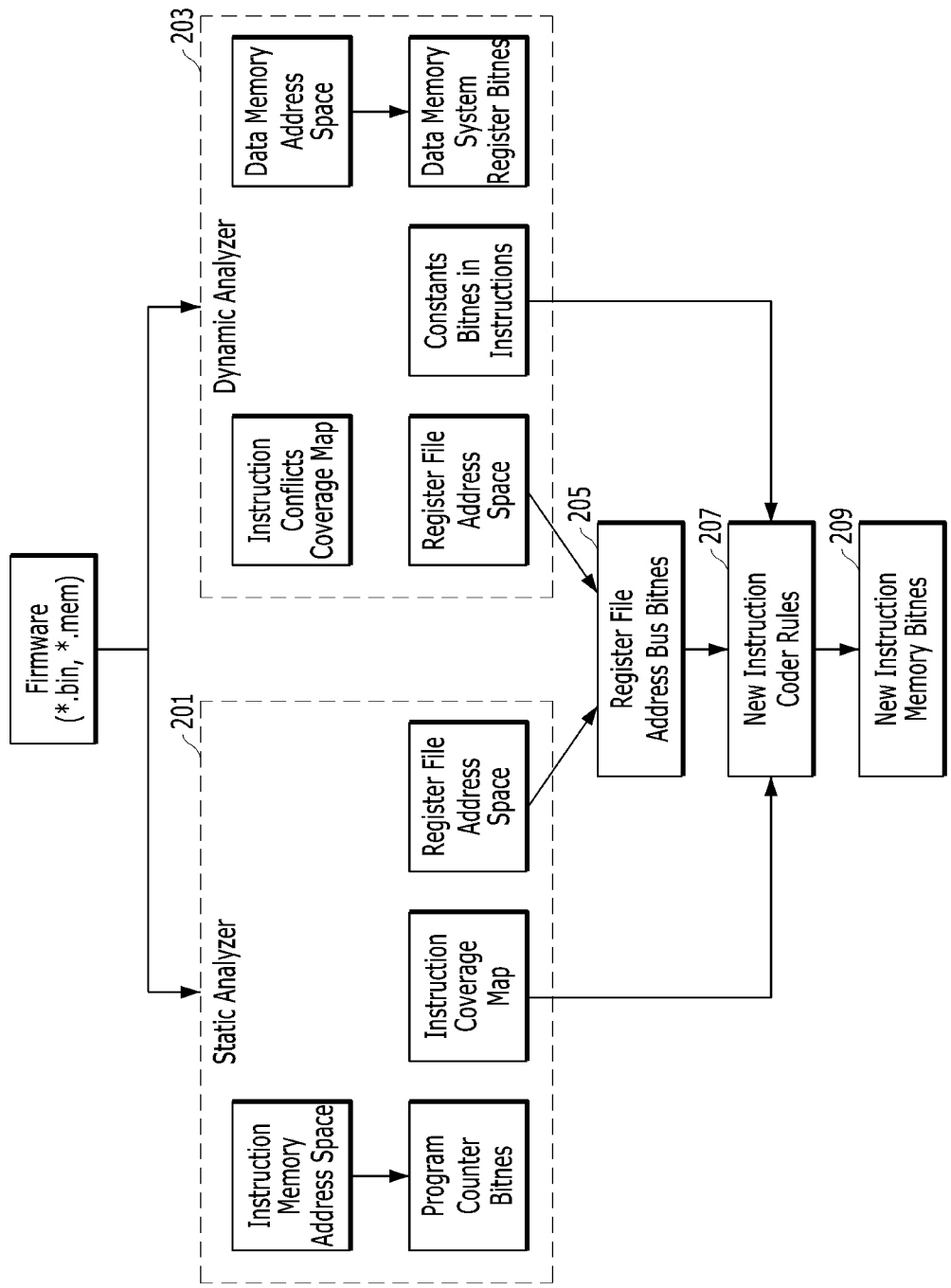
FIG. 2 is a schematic diagram illustrating the static analysis and the dynamic analysis used in accordance with one embodiment of the present invention.

After analysing the machine code (or program code) to obtain the microprocessor configuration, the characteristics of the code and their mutual dependencies are realized. FIG. 2 is a block diagram showing schematically one process for obtaining a) code characteristics and b) a preliminary configuration of the software processor for the hardware accelerator.

FIG. 2 shows that, at the start of this process, the firmware (at for example 109 of FIG. 1) is analysed by a static analyser 201 and a dynamic analyser 203. While described in more detail below, in the static analyser 201, instruction memory space addresses are obtained. Afterwards, program counter bit widths are obtained. The static analyser 201 in FIG. 2 may also obtain an instruction coverage map, and may obtain a register file address space.

The dynamic analyser 203 in FIG. 2 obtains instructions for the above-noted hazards in a coverage map, and obtains data memory space addresses. The dynamic analyser 203 may also obtain data memory system bit width, constant bit width in the instructions, and a register file address space. At 205, the register file address space obtained by static analyser 201 (or by dynamic analyser 203) can be joined (by a cross intersection operation) to know what register space is needed. At 207, the instruction coverage map obtained by static analyser 201 or the constant bit width in the instructions are used to produce new instruction coder rules that will be used to reduce the size of the original instructions. At 209, new instructions on the memory bit width are generated that will be used to reduce the word width in instruction memory.

After receiving the configuration of the microprocessor system, a reconfiguration of the HDL description of the microprocessor core may occur with the use of the header files.

EXAMPLE

The following hardware was used to demonstrate the inventive method for building a hardware accelerator which in this example can perform bubble sorting:

1. Computer Aided Design (CAD) from AMD (Xilinx)—Vivado® version 2020.2. (See www.xilinx.com.)
2. Debug board Nexys-4 from Digilent with an FPGA chip Artix-7(AMD—Xilinx). (See www.digilentinc.com and www.xilinx.com)

Machine code analysis with the use of two types of code analysers and a statically reconfigurable soft-processor of a RVI-32 architecture were implemented. (See riscv.org/technical/specifications)

RVI-32 architecture. A 32-bit RISC-V Integer microprocessor architecture (which is a reduced instruction set computer RISC) is a basic microprocessor. The microprocessor capacity of the RISC-V Integer microprocessor corresponds to 4 bytes, the register file consists of 31 program-accessible registers, and one constant register with address 0 and a zero value. The integer extension in the RISC-V Integer microprocessor has 6 types of encoded instructions, depending on their purpose, in total there are 44 available instructions.

Figure 3:
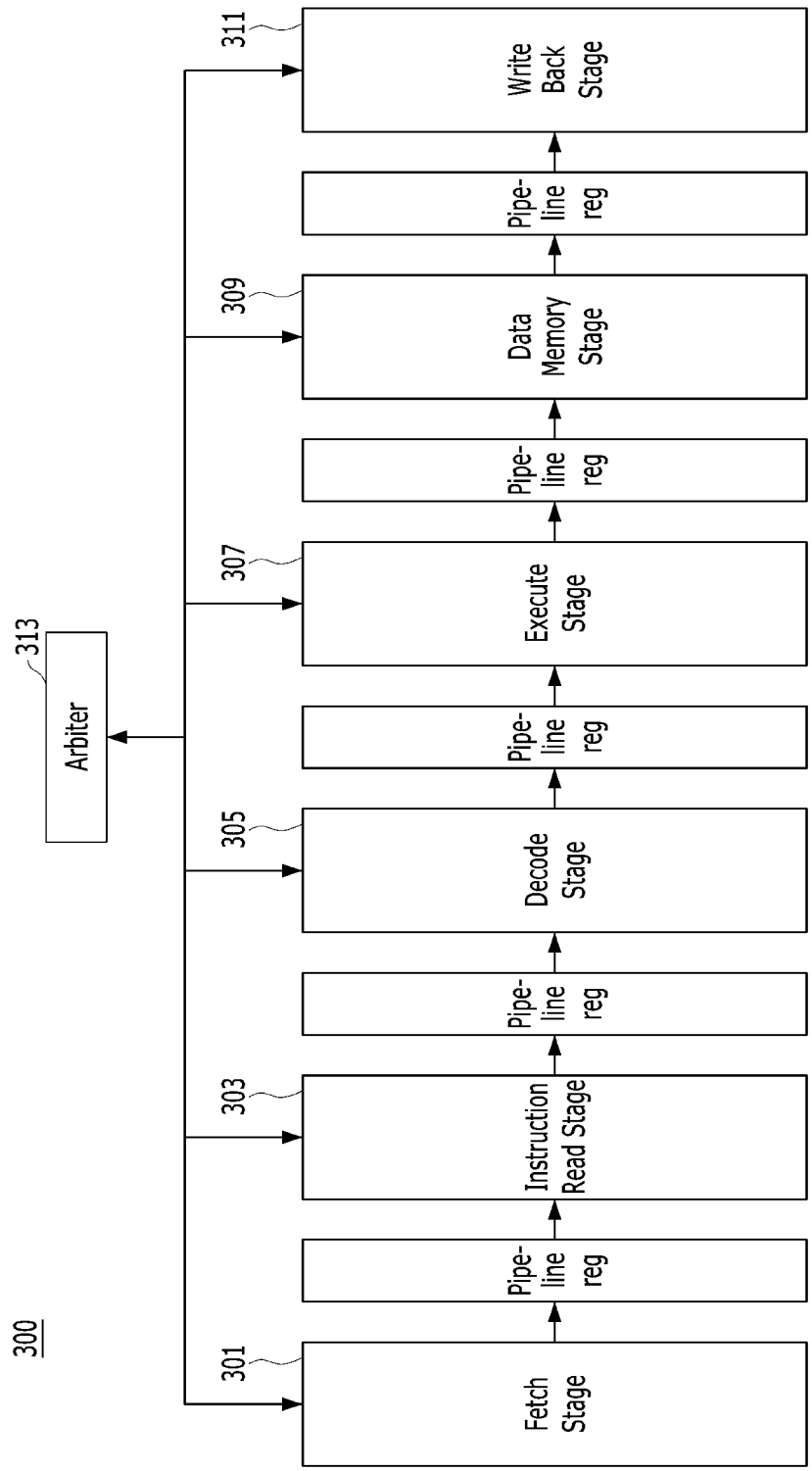
FIG. 3 is a schematic illustration of the operation of a code analyzer in accordance with another embodiment of the present invention.

RISC-V architecture for this experiment. FIG. 3 is a functional diagram of one implementation of a pipeline 300 utilizing as a microprogramming machine with the RVI-32 architecture noted above. The microprocessor core in this example can be considered a 6-stage computing pipeline 300 with the main functional blocks labelled in FIG. 3 as Fetch stage 301, Instruction Read stage 303, Decode stage 305, Execute stage 307, Data Memory stage 309, and WriteBack stage 311. The Arbiter module 313 in FIG. 3 executes control and management of the pipeline 300 and resolves hazards in the core. All of these stages permit custom configuration and reconfiguration, such that these stages can support changing internal core parameters, such as the width of the interstage registers, the configuration of hazard resolution blocks, the exclusion of registers from the register file, the configuration of data memory and machine instructions, etc.

At Fetch Stage 301, a new value of the program counter is calculated, pointing to the address of the instruction being read. At Instruction Read Stage 303, the instruction is retrieved from the instruction memory (or cache) at the address recorded in the program counter. At Decode Stage 305, the received instruction is decoded and further actions are determined to control the pipeline (which registers to access, which instruction to execute). At Execute Stage 307, an arithmetic-logical unit ALU performs operations on the data (such as for example, addition or comparison). At Data Memory Stage 309, the data memory is accessed. At Write Back Stage 311, the previously received data is written to the register file located at the decoding stage (305). There are five pipeline registers which are located between pipeline stages (for example, between Fetch Stage 301 and Instruction Read Stage 303, etc.).

Feedback loops are provided from Write Back Stage 311 to Decode Stage 305 and from Execute Stage 307 to Fetch Stage 301.

Firmware. A standard bubble sort algorithm written in C programming (Listing 1) was used for this example for demonstration of the invention's capability to optimize a hardware accelerator. The compilation process (as noted in FIG. 1 at 103) was carried out to obtain the machine code corresponding to the following C program.

Listing 1.

```
static unsigned array [ ] = {0, 1, 2, 3, 4, 5, 6, 7, 8, 9, 10};
static const size_t array_length = size of ( array ) / size of ( array[ 0 ] );
void main ( ){
    int temp = 0;
    for (int i = 0; i < array_length - 1; i++){
        for (int j = (array_length - 1); j > i; j--){
            if (array [j - 1] > array [j]){
                temp = array [j - 1];
                array [j - 1] = array [j];
                array [j] = temp;
            }
        }
    }
}
```

After analysing and optimizing the C program code by the compiler, as well as any subsequent compilation process performed with riscv-gcc, files with assembler and machine instructions (shown in Listing 2) were obtained.

Listing 2.
00000000 <main>:

| 00: | 000026b7 | lui  | a3, 0x2 |
| 04: | 00000713 | li   | a4, 0 |
| 08: | 00a00793 | li   | a5, 10 |
| 0c: | 00068693 | mv   | a3, a3 |
| 10: | 00a00893 | li   | a7, 10 |
| 14: | fff78613 | addi | a2, a5, -1 |
| 18: | 00261593 | slli | a1, a2, 0x2 |
| 1c: | 00279793 | slli | a5, a5, 0x2 |
| 20: | 00b685b3 | add  | a1, a3, a1 |
| 24: | 00f687b3 | add  | a5, a3, a5 |
| 28: | 0005a503 | lw   | a0, 0(a1) |
| 2c: | 0007a803 | lw   | a6, 0(a5) |
| 30: | 00a87663 | bgeu | a6, a0, 4c <main + 0x3c> |
| 34: | 0105a023 | sw   | a6, 0(a1) |
| 38: | 00a7a023 | sw   | a0, 0(a5) |

Listing 2.
00000000 <main>:

| 3c: | 00c74a63 | blt  | a4, a2, 60 <main + 0x50> |
| 40: | 00170713 | addi | a4, a4, 1 |
| 44: | 01171463 | bne  | a4, a7, 5c <main + 0x4c> |
| 48: | 00008067 | ret  | |
| 4c: | 00a00613 | li   | a2, 10 |
| 50: | 00060793 | mv   | a5, a2 |
| 54: | 00100073 | ebreak | |

Static analysis: As seen from the machine code of the program (as well as the mnemonic decoding of the latter), access to instructions and registers used to implement the inventive hardware accelerator builder algorithm provides knowledge of which resources are needed and not needed (unused):

1. Instructions: lui, addi, slli, add, lw, sw, bgeu, blt, bne, jal, jalr, ebreak.
2. Registers: a0, a1, a2, a3, a4, a5, a6, a7.

As is apparent from the list of instructions and registers used, only 8 registers in the register file out of the 31 total registers (25.8%) and only 12 instructions out of the 44 total instructions presented in the standard set of instructions (~25%) were needed to execute the bubble sort algorithm. The maximum address is 0x54 for machine instruction memory addresses and its size, the total size, is 84 bytes. Therefore, for an improved operation of the hardware accelerator core, the bit width of the program counter can be 8 bits instead of 32 bits (a 25% reduction). In one embodiment of the invention, a code analyzer (such as the RVI-32 based code analyzer) can be used both to assess resources and to make changes in the soft-processor core such as changing, for example the bit width of register file, system registers, system bus, etc Dynamic analysis: For further optimization of the soft-processor core, a dynamic analysis was conducted with the use of several sets of input values to provide a greater variety of input data in order to cover totally a graph of the computational process. Let such sets be illustrated by the following three cases of sequence numbers for the bubble sorting algorithm.

array[ ]={0,1,2,3,4,5,6,7,8,9,10};//best(0 permutations)

array[ ]={10,9,8,7,6,5,4,3,2,1,0};//worst(55 permutations)

array[ ]={9,1,3,6,2,5,10,7,4,9,0};//medium(26 permutations)

The naming of these sequences as the "best," the "worst" and "medium" was used. In the best case, all elements are already sorted, and no permutations were required for the correct bubble order. In the worst case, all elements are sorted but in reverse order, and 55 permutations were required for the correct bubble order. In the medium case, the number of permutations is equal to the arithmetic mean between the best and worst cases.

After running the dynamic analysis process for all three sets of input data, three different reports were generated as shown in Table 1. The table also contains a report of the static analyser in addition to the dynamic analyser reports to simplify perception. In this report shown in Table 1 shown below, it is seen that, in the "instructions" analysis, the number of instructions utilized is changed between a) the worst case input data run needing 11 of 44 instructions to perform the bubble sort and b) the best case input data run needing 9 of 44 instructions to perform the bubble sort. Similarly, the bit width immediate b-type required a change between the worst case and the best case.

TABLE 1

|  | Worst case | Medium case | Best case | Static analyze | Coverage |
|---|---|---|---|---|---|
| Number of used registers | 8/31 | 8/31 | 8/31 | 8/31 | 100% |
| Number of used instructions | 11/44 | 11/44 | 9/44 | 11/44 | 100% |
| Data memory size | 44 b | 44 b | 44 b | 44 b | 100% |
| Instruction memory size | 84 b | 84 b | 84 b | 84 b | 100% |
| Maximal value of PC | 0x54 | 0x54 | 0x54 | 0x54 | 100% |
| Minimal address value in data memory | 0x00 | 0x00 | 0x00 | 0x00 | 100% |
| Maximal address value in data memory | 0x54 | 0x54 | 0x54 | 0x54 | 100% |
| Number of bits used in Immediate I-type | 12/12 | 12/12 | 12/12 | — | — |
| Number of bits used in Immediate S-type | 0/12 | 0/12 | 0/12 | — | — |
| Number of bits used in Immediate B-type | 7/13 | 7/13 | 6/13 | — | — |
| Number of bits used in Immediate U-type | 0/19 | 0/19 | 0/19 | — | — |
| Number of bits used in Immediate J-type | 0/9 | 0/9 | 0/9 | — | — |

Recoding instructions. After carrying out this analyses, in one embodiment of the invention, by way of the code analyzer, instruction encoding is changed in order to reduce the hardware costs for decoding and to reduce the total required number of bits for storage. The information used for the recode instructions is as follows:

Registers—only (a0-a7)
Register File Address bit width—5 bit
Instructions—only lui, addi, slli, add, lw, sw, bgeu, blt, bne, jal, jalr, ebreak
Program Memory Word bit width—28
Program Memory Start Address—0x00000000
Program Memory End Address—0x00000054
Program Counter bit width—8 bit
Data Memory Start Address—0x00000000
Data Memory End Address—0x0000002C
Data Memory Address Bus bit width—6 bit
type Immediate Registers—12 bit
S-type Immediate Registers—0 bit
B-type Immediate Registers—7 bit
U-type Immediate Registers—0 bit
J-type Immediate Registers—0 bit The results above show that there is no need to use 7(opcode)+3(funct3)+7(funct7) bits per control part in commands to encode only 22 instructions in the case of the bubble sort algorithm. Table 2a shows the standard instruction coding, and Table 2b shows (based on the inventive method) the modified instruction coding for the bubble sort algorithm.

TABLE 2a

Standard RVI-32 instruction coding

| Type | 31-25 | 24-20 | 19-15 | 14-12 | 11-7 | 6-0 |
|---|---|---|---|---|---|---|
| R | funct7 | rs2 | rs1 | funct3 | rd | opcode |
| I | imm[11:0] | | rs1 | funct3 | rd | opcode |
| S | imm[11:5] | rs2 | rs1 | funct3 | imm[4:0] | opcode |
| B | imm[12\|10:5] | rs2 | rs1 | funct3 | imm[4:1\|11] | opcode |

TABLE 2a-continued

Standard RVI-32 instruction coding

| Type | 31-25 | 24-20 | 19-15 | 14-12 | 11-7 | 6-0 |
|---|---|---|---|---|---|---|
| U | imm[31:12] | | | | rd | opcode |
| J | imm[20\|10:1\|11\|19:12] | | | | rd | opcode |

TABLE 2b

Configurable hardware accelerator instruction encoding

| Type | 20-19 | 18-14 | 13-9 | 8-4 | 3-0 |
|---|---|---|---|---|---|
| R | Not Used | rs2 | rs1 | rd | opcode |
| I | Not Used | | rs1 | rd | opcode |
| S | Not Used | rs2 | rs1 | Not Used | opcode |
| B | imm[7:6] | rs2 | rs1 | imm[5:1] | opcode |
| U | Not Used | | | rd | opcode |
| J | Not Used | | | rd | opcode |

Having the width of the command word at 21 bits, not 32 bits, saves 11 bits per command word with this new type of coding.

Synthesis and analysis of experimental results. In order to confirm the suitability of the reconfiguration, the reconfigured kernel (with reduced register size, decoder recording, reduced machine command size, and reduced bit depth) was used based on the parameters listed above.

Synthesis of the microprocessor system architecture (using the code analyzer) with the reconfigured kernel was carried out with the FPGA chip Artix-7 XC7A100T-1CSG324C (noted above). The results of the synthesizer operation in the form of necessary implementation costs, as well as the value of the critical path are shown in Table 3. The path with the maximum delay in the circuit is considered the critical path, with the maximum delay constituting the reciprocal of the work frequency.

TABLE 3

Comparison results of cores as a hardware accelerator.

|  |  | Standard Core | Configured Core | Configured/ Standard |
|---|---|---|---|---|
| Look Up Table's | | 1406 | 783 | 55.6% |
| Flip Flops | | 1504 | 859 | 57.1% |
| Used BRAM blocks | Data | 352 bits | 352 bits | 0% |
| | Instruction | 704 bits | 462 bits | 65.6% |
| Maximum Work Frequency | | 101 MHz | 117 MHz | 115.8% |

As seen from the results in Table 3, the cost of implementing the reconfigured kernel was reduced by a factor of 2 in the case of Look Up Tables and Flip Flops, reduced by 65.6% in the case of the required number of stored command memory bits, and the reconfigured kernel provided an increase in performance by 15.8% due to the increase in the maximum operating clock frequency due to a decrease in the critical path when performing operations on the arithmetic logic unit.

The inventive hardware accelerator builder in one aspect of the invention makes it possible (for a given algorithm to be implemented in a hardware accelerator) to obtain a hardware accelerator based on a soft (reprogrammable) processor core with reduced hardware costs relative to a standard implementation of a hardware accelerator. The reconfiguration process includes several stages that embody: static and/or dynamic analysis, changes in the microprocessor system architecture of the code analyzer, generation of intermediate and final configurations.

The inventive hardware accelerator builder in one aspect of the invention identifies and removes unused instructions and operating blocks from the microarchitecture, and implements changes to the architecture of the soft-processor. The inventive hardware accelerator builder in one aspect of the invention may also reduce the critical path by reducing the redundancy of operating units in the computational core which leads to an increase in the maximum performance of the hardware accelerator.

Figure 4:
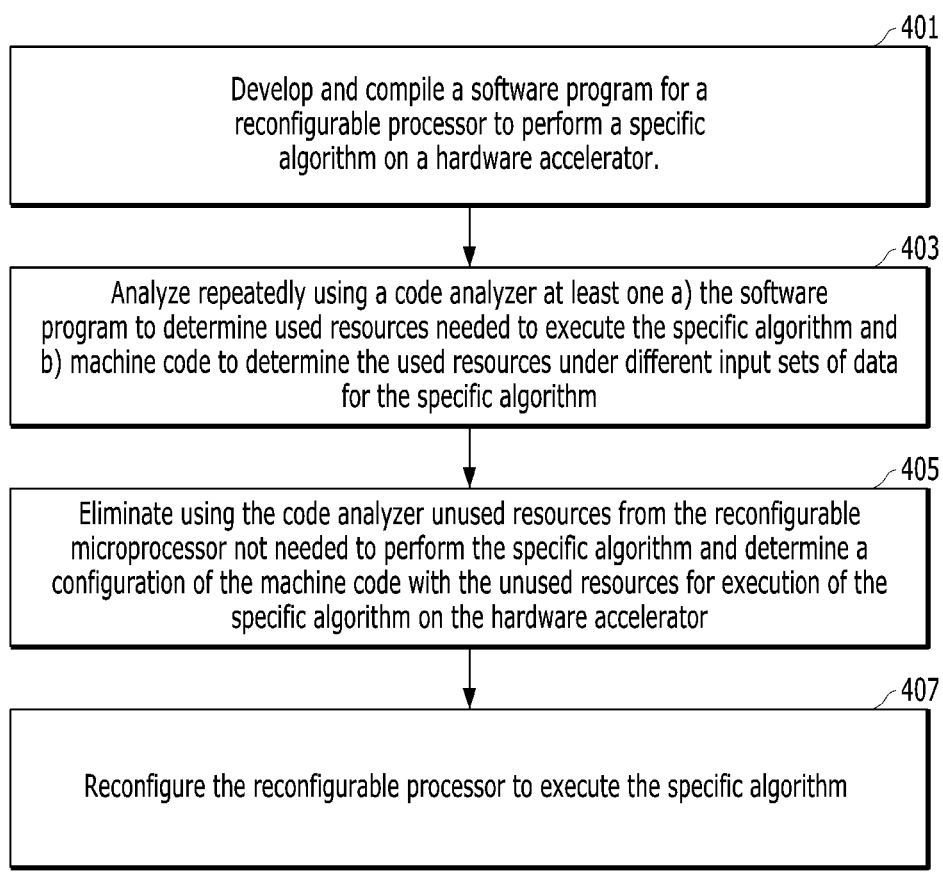
FIG. 4 is a flowchart illustrating a method for building a hardware accelerator in accordance with one embodiment of the present invention.

FIG. 4 is a flow chart depicting a method for building a hardware accelerator. At 401, the method obtains the software as input and compiles it for a reconfigurable processor to perform a specific algorithm on the hardware accelerator. At 403, the method analyzes at least one of a) the software to determine a map of used resources needed to execute the specific algorithm and b) machine code to determine the used resources under different input sets of data for the specific algorithm. At 405, the method eliminates unused resources from the reconfigurable processor not needed to perform the specific algorithm and determines a configuration of the machine code with the unused resources for execution of the specific algorithm on the hardware accelerator. At 407, the method reconfigures the reconfigurable processor to execute the specific algorithm.

In this method, the eliminating unused resources from the reconfigurable processor may comprise eliminating unused program instructions from the reconfigurable processor or may comprise eliminating unused registers from the reconfigurable processor.

In this method, the repeated analyzing may comprise repeating dynamic analysis of machine code for the different input sets of data used by the hardware accelerator in performance of the specific algorithm. The different input sets of data may comprise a range of ways for the input data to be supplied the hardware accelerator, and the range of ways for the input data to be supplied the hardware accelerator may comprise all ways for the input data to be supplied the hardware accelerator.

In this method, the reconfiguring the reconfigurable processor may comprise reducing a width of a command word used by the reconfigurable processor, and may comprise reducing a number of stored command memory bits needed to perform the specific algorithm. In this method, the reducing the width of a command word and the reducing the number of stored command memory bits (individually or in combination) can increase an operating clock speed of the reconfigurable processor as compared to a processor without these reductions. This method may verify that the reconfigurable processor performs the specific algorithm.

Figure 5:
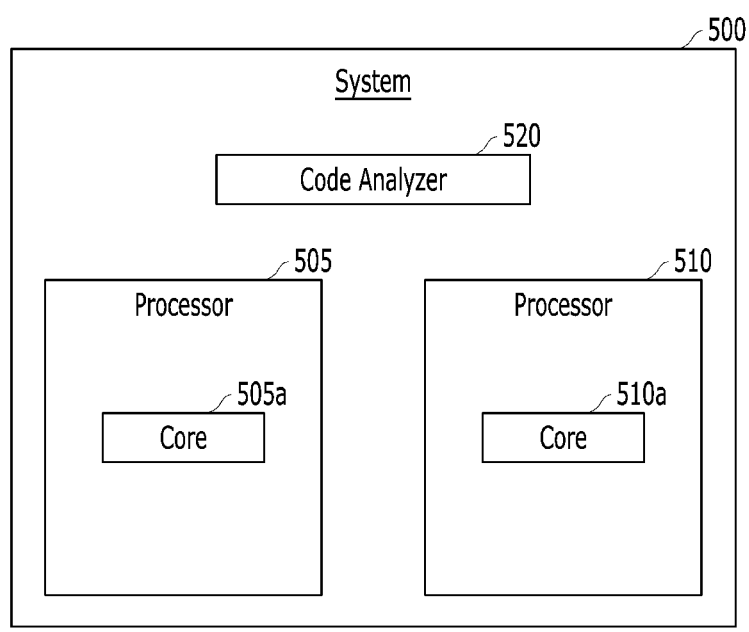
FIG. 5 is a schematic diagram illustrating a computing system for building a hardware accelerator in accordance with another embodiment of the present invention.

In one embodiment of the invention, there is provided a system for building a hardware accelerator. FIG. 5 is a schematic illustration of an inventive system 500 having at least one processor (as shown here processors 505 and 510 having respective cores 505a and 510a). At least one core (for example core 505a) is configured to perform based on machine code an operation (such as for example arithmetic, logical, control and/or other operations) for a specific algorithm of the hardware accelerator. At least one of the processors (for example processor 510) is a reconfigurable processor. System 500 has a code analyzer 520 for reprogramming the at least one processor (for example processor 510) to execute with the machine code the specific algorithm.

In this embodiment, code analyzer 520 is configured to repeatedly execute at least one of a) a static analysis on a software program for performance of the specific algorithm and b) a dynamic analysis regarding the machine code on different input sets of data. Code analyzer 520 may also be configured to analyze results of the static analysis or the dynamic analysis to determine a configuration of the machine code for execution of the specific algorithm on the hardware accelerator.

In system 500, code analyzer 520 may be further configured to analyse a) the software program to determine used resources needed to execute the specific algorithm and b) the machine code to determine the used resources under different input sets of data to the specific algorithm Code analyzer 520 may be further configured to eliminate unused resources from the reconfigurable processor 510 and determine the configuration of the machine code without the unused resources for the execution of the specific algorithm on the hardware accelerator.

In system 500, code analyzer 520 may be further configured to eliminate unused program instructions from the reconfigurable processor 510 or eliminate unused registers from the reconfigurable processor. In one embodiment, code analyzer 520 is configured to repeat dynamic analysis of the machine code for the different input sets of data used by the hardware accelerator in performance of the specific algorithm. Here, the different input sets of data may comprise a range of ways for the input data to be supplied the hardware accelerator, and the range of ways for the input data to be supplied the hardware accelerator may comprise all ways for the input data to be supplied the hardware accelerator.

In system 500, code analyzer 520 may be further configured to reduce a width of a command word used by a reconfigurable processor to execute the specific algorithm and/or reduce a number of stored command memory bits needed to perform the specific algorithm. As a consequence of the reduced width of the command word and the reduced number of the stored command memory bits, an operating clock speed of the reconfigurable processor may be increased as compared to a processor without these reductions.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives recognized by one skilled in the art.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "system" or "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. A system for building a hardware accelerator, comprising:
    at least one reconfigurable processor including at least one core configured to perform based on machine code an operation for a specific algorithm of the hardware accelerator; and
    a code analyzer for reconfiguring the at least one reconfigurable processor to execute with the machine code for the specific algorithm,
    wherein the code analyzer is configured to:
    repeatedly execute at least one of a) a static analysis on a software program for performance of the specific algorithm and b) a dynamic analysis regarding the machine code on different input sets of data, and
    analyze results of the static analysis or the dynamic analysis to determine a configuration of the machine code for execution of the specific algorithm on the hardware accelerator that eliminates unused resources from the at least one reconfigurable processor.

2. The system of claim 1, wherein the code analyzer is configured to:
    analyse a) the software program to determine used resources needed to execute the specific algorithm and b) the machine code to determine the used resources under the different input sets of data to the specific algorithm;
    determine the configuration of the machine code without the unused resources for the execution of the specific algorithm on the hardware accelerator; and
    reconfigure the at least one reconfigurable processor to execute the specific algorithm.

3. The system of claim 1, wherein the code analyzer is configured to:
    eliminate unused program instructions from the at least one reconfigurable processor.

4. The system of claim 1, wherein the code analyzer is configured to:
    eliminate unused registers from the at least one reconfigurable processor.

5. The system of claim 1, wherein the code analyzer is configured to repeat dynamic analysis of the machine code for the different input sets of data used by the hardware accelerator in performance of the specific algorithm.

6. The system of claim 5, wherein the different input sets of data comprise a range of ways for the input data to be supplied the hardware accelerator.

7. The system of claim 6, wherein the range of ways for the input data to be supplied the hardware accelerator comprise all ways for the input data to be supplied the hardware accelerator.

8. The system of claim 1, wherein the code analyzer is configured to reduce a width of a command word used by the at least one reconfigurable processor to execute the specific algorithm.

9. The system of claim 8, wherein the code analyzer is configured to reduce a number of stored command memory bits needed to perform the specific algorithm.

10. The system of claim 9, wherein the reduced width of the command word and the reduced number of the stored command memory bits result in an increased operating clock speed of the at least one reconfigurable processor.

11. A method for building a hardware accelerator, comprising:
 developing and compiling a software program for a reconfigurable processor to perform a specific algorithm on the hardware accelerator;
 repeatedly analysing using a code analyzer at least one of a) the software program to determine used resources needed to execute the specific algorithm and b) the used resources under different input sets of data the the specific algorithm;
 with the code analyzer, eliminating unused resources from the reconfigurable processor and determining a configuration of the machine code with the unused resources for execution of the specific algorithm on the hardware accelerator; and
 reconfiguring the reconfigurable processor to execute the specific algorithm.

12. The method of claim 11, wherein the eliminating unused resources from the reconfigurable processor comprises eliminating unused program instructions from the reconfigurable processor.

13. The method of claim 11, wherein the eliminating unused resources from the reconfigurable processor comprises eliminating unused registers from the reconfigurable processor.

14. The method of claim 11, wherein the repeated analyzing comprises: repeating dynamic analysis of machine code for the different input sets of the data used by the hardware accelerator in performance of the specific algorithm.

15. The method of claim 14, wherein the different input sets of the data comprise a range of ways for the input data to be supplied the hardware accelerator.

16. The method of claim 15, wherein the range of ways for the input data to be supplied the hardware accelerator comprise all ways for the input data to be supplied the hardware accelerator.

17. The method of claim 11, wherein the reconfiguring the reconfigurable processor comprises reducing a width of a command word used by the reconfigurable processor.

18. The method of claim 17, wherein the reconfiguring the reconfigurable processor comprises reducing a number of stored command memory bits needed to perform the specific algorithm.

19. The method of claim 18, wherein the reducing the width of a command word and the reducing the number of stored command memory bits increase an operating clock speed of the reconfigurable processor as compared to a processor without these reductions.

20. The method of claim 11, further comprising verifying that the reconfigurable processor performs the specific algorithm.

* * * * *